(No Model.)

H. B. NORTON.
SHUTTER FOR PHOTOGRAPHIC CAMERAS.

No. 446,880. Patented Feb. 24, 1891.

Witnesses
Chas. J. Williamson
C. W. Curtis

Inventor
Henry B. Norton
by Franklin H. Hough
his attorney

UNITED STATES PATENT OFFICE.

HENRY B. NORTON, OF MINNEAPOLIS, MINNESOTA.

SHUTTER FOR PHOTOGRAPHIC CAMERAS.

SPECIFICATION forming part of Letters Patent No. 446,880, dated February 24, 1891.

Application filed September 18, 1890. Serial No. 365,390. (No model.)

*To all whom it may concern:*

Be it known that I, HENRY B. NORTON, a citizen of the United States, residing at Minneapolis, in the county of Hennepin and State of Minnesota, have invented certain new and useful Improvements in Shutters for Photographic Cameras; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in instantaneous shutters for photographic cameras; and it has for its object to provide a shutter of the character mentioned the construction and operation of which will serve to so distribute the light as to give upon the dark objects in the foreground more light than is given to the background of the picture.

The shutter is intended more especially for use in out-of-door or landscape photography, in which the background of the picture is frequently of either the clear sky or of clouds, and it is well known in photography that in order to secure the best results in pictures of this kind the background of the picture should be given a much shorter exposure than is required by the darker objects in the foreground; and the essential object of the present invention is to provide a means whereby the background may be protected from overexposure and to so distribute the light as to fully time the foreground of the landscape and at the same time prevent the sky from being overtimed by too much light.

To these ends and to such others as the invention may pertain the same consists in the peculiar construction and in the novel combination, arrangement, and adaptation of parts, all as more fully hereinafter described, shown in the accompanying drawings, and then specifically defined in the appended claims.

The invention is clearly illustrated in the accompanying drawings, which, with the letters of reference marked thereon, form a part of this specification, like letters of reference indicating like parts throughout the several views, and in which drawings—

Figure 1:
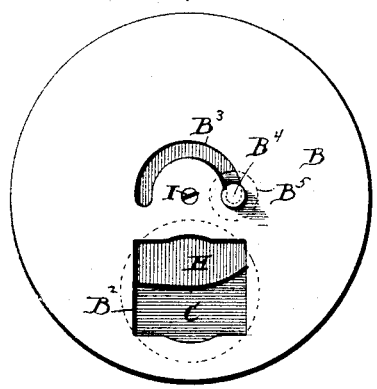
Figure 2:
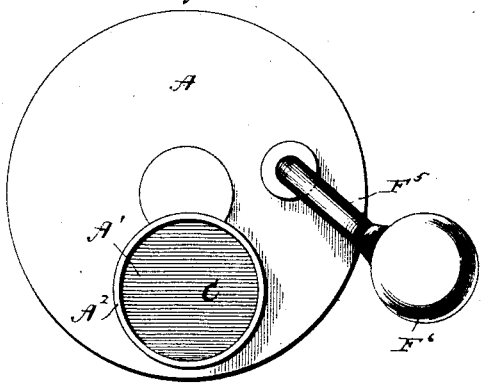
Figure 3:
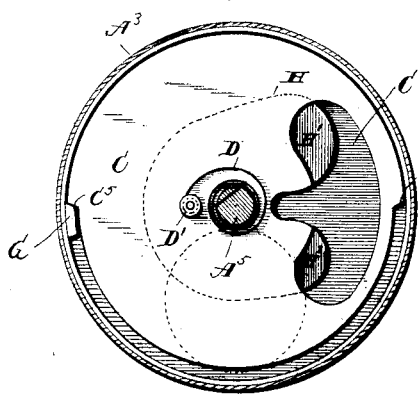
Figure 4:
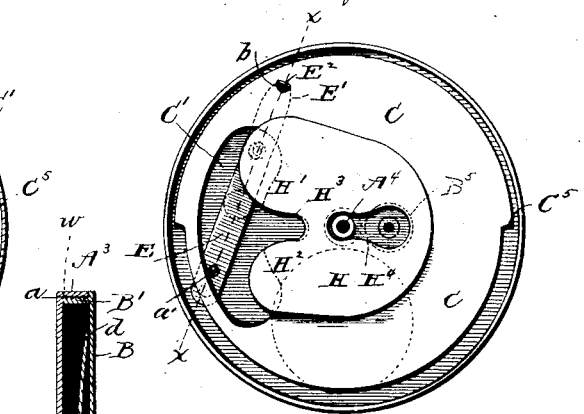
Figure 5:
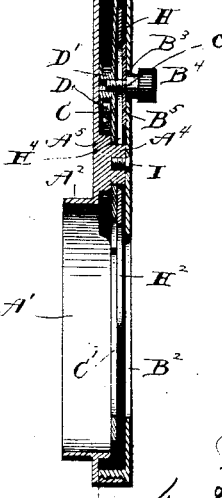
Figure 6:
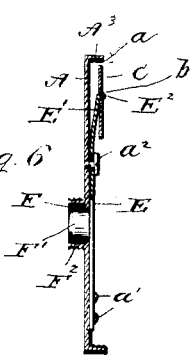

Figure 1 is a front view of a camera-shutter constructed in accordance with my invention. Fig. 2 is a rear view of the same. Fig. 3 is a rear view of the shutter with the back plate removed. Figs. 4, 5, and 6 are details which will be more fully hereinafter described.

Reference now being had to the details of the drawings by letter, A represents the rear plate of the shutter, which is provided with the usual opening $A'$ and rearwardly-extending flange or collar $A^2$, which serves to permit the shutter to be attached to the camera, and upon its opposite side the said plate is provided with a peripheral flange $A^3$, said flange being screw-threaded upon its inner side, as shown at $a$, to receive the screw-threaded extension or peripheral flange $B'$ upon the front plate B. The disk C, which is preferably constructed of sheet metal and of substantially the form shown, is loosely sleeved upon the central pivot of post $A^4$ upon the inner face of the plate A, and upon the enlarged base portion $A^5$ of said post is coiled the spring D, one end of which spring is attached to the post and its opposite end secured to a post or projection $D'$ upon the rear face of the disk C, as shown. The disk is provided at one side of its pivotal center with a substantially pear-shaped opening $C'$, for a purpose which will presently appear.

E is a flat strip of spring-metal which is riveted or otherwise suitably secured to the inner face of the rear plate A. In the present instance I have shown this plate secured by rivets $a'$ at one end of the plate and by a screw $a^2$ at a point substantially one-half of the distance between the longitudinal center of the spring-plate and its free end, and the said free end $E'$ is inclined outwardly from the plate A and is provided with a lug or catch $E^2$, which is adapted when the disk C is rotated, as hereinafter described, to enter the opening $b$ in the disk and hold the same against the tension of the coiled spring D.

Within a suitable opening F, provided in the plate A, directly beneath the longitudinal center of the spring-plate E, is loosely seated the plug $F'$, and surrounding this aperture upon the rear face of the plate A is a metallic collar $F^2$, to which the usual rubber pipe $F^5$, with its accompanying air-bulb $F^6$, may be attached when it is designed to operate the shutter by the action of compressed air. It will be seen that when the plug F' is pressed inwardly its action upon the rear face of the spring-plate E will serve to release the lug or catch E² from its engagement with the disk C, when the said disk will be caused to rotate by the tension of the spring D, the throw of the disk being limited by the engagement of the projection C⁵ upon the disk with the stop G.

H is an irregular heart-shaped shield or disk of sheet metal, one of the lobes H' being preferably larger than the opposite lobe H². This shield is provided with a pear-shaped opening H⁴, the smaller end of the opening being adjacent to the inner end of the cut-away portion or indentation H³ upon the lower edge of the shield, said aperture H⁴ being adapted to be fitted over the post A⁴ and to occupy the space between the disk C and the front plate B.

The front plate B of the device is provided with an opening B², corresponding with the opening A' in the rear plate A. Directly above the opening B² in the plate B a semicircular slot or opening B³ is provided in the plate, and through this slot is passed a set-screw B⁴, said screw passing through the opening H⁴ in the shield or disk H and into a screw-threaded opening provided for the purpose in the disk C. The set-screw B⁴ is provided with a shoulder c, which is adapted to bear upon the upper face of the washer B⁵, which is interposed between the shield H and the plate B, and thus the shield and disk are held together by frictional contact. A screw I, passed centrally through the plate B, passes into the central post A⁴ and serves to retain the plate in position, while the post serves as a pivotal center upon which the disk C and shield or disk H rotate, as will be readily understood. It will be observed upon reference to the drawings that the disk C is bent so as to present a bearing-surface d upon the plate B. By this construction I am enabled to readily adjust the screw B⁴ so as to regulate the speed of the rotating disk, as by tightening the screw the friction will be increased and the speed lessened.

In operation the screw B⁴ is slightly loosened and the shield H is moved either up or down, as may be required to properly regulate the exposure in the picture to be taken. It will be readily seen that the proper adjustment of this shield will require the exercise of judgment upon the part of the operator, and that it will depend in each instance upon the nature of the background to be included in the picture. Hence if the background is very light while the objects in the foreground are dark the shield will of course be lowered, while if the background should be dark the shield would be raised.

When it is considered that were the lobes H' and H² similar in size and form lines would be apt to be formed in the picture, my object in varying the form and size of this portion of the shield will be understood, as by this construction I am enabled to obviate this difficulty, and while I do not in this connection desire to limit myself to the particular form of disk or shield shown I deem it an essential feature of my invention that irregular forms and lengths should be employed, in order to prevent the formation of lines upon the picture.

While I have shown the shutter as provided with the usual rubber pipe and bulb and prefer to operate the shutter by the use of compressed air, it is at once evident that if for any reason it should be considered desirable the pipe and bulb may be omitted and the shutter operated by hand.

It will be seen that by moving the screw B⁴ from left to right within the slot B³ the shutter-disk C will be given a one-half revolution, and that it will be locked in place by the engagement of the lug or latch upon the spring-plate E with the aperture in the disk. By pressing the plug F' the latch is disengaged, and the tension of the spring D will serve to give the disk a one-half revolution, thereby uncovering and again covering the lens.

Having thus described my invention, what I claim to be new, and desire to secure by Letters Patent, is—

1. In a shutter for photographic cameras, the combination, with the shutter proper and mechanism for operating the same, of mechanism for regulating the admission of light so as to allow a longer time exposure to the lower than to the upper portion of the lens, and the disk having lobes of irregular and different forms, substantially as and for the purpose specified.

2. In a shutter for photographic cameras, mechanism, substantially as described, embodying an eccentrically-arranged supplemental shutter for regulating the width of the lens-opening upon a line corresponding with the axis of the shutter, substantially as shown and described, and for the purpose set forth.

3. In a shutter for photographic cameras, the combination, with the shutter proper, of an eccentrically-arranged supplemental shutter carried by the shutter proper and adapted to be adjusted thereon to limit the width of the lens-opening upon a line corresponding with the axis of the shutter, substantially as described.

4. The combination, with the front and rear plates A and B, provided with openings, as described, the disk C, pivoted between said plates and provided with spring-actuating mechanism, and devices for releasing and regulating the movement of the disk, of an irregular heart-shaped shield carried by the disk and adapted to be adjusted thereon to regulate the vertical width of the lens-opening, substantially as and for the purpose specified.

5. In a shutter for photographic cameras, the combination, with the shutter proper and its actuating and releasing mechanism, of an irregular shield or plate adapted to regulate the size and form of the lens-opening and prevent the formation of lines upon the face of the negative, substantially as described.

6. In a photographic-camera shutter, the combination, with the front and rear plates, the rotatable shutter interposed between the plates, and the irregular shield or plate, of mechanism, substantially as specified, for regulating the speed of the shutter, substantially as and for the purpose specified.

In testimony whereof I affix my signature in presence of two witnesses.

HENRY B. NORTON.

Witnesses:
W. M. STONE,
GEORGE D. RAYMON.